United States Patent
Zhang et al.

(10) Patent No.: US 11,516,646 B2
(45) Date of Patent: **\*Nov. 29, 2022**

(54) NETWORK FUNCTION DATA LAYER DETERMINATION

(71) Applicant: Motorola Mobility LLC, Chicago, IL (US)

(72) Inventors: Zhuoyun Zhang, Beijing (CN); Chenxi Zhu, Fairfax, VA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,133

(22) Filed: Jan. 25, 2021

(65) Prior Publication Data
US 2021/0176619 A1 Jun. 10, 2021

Related U.S. Application Data

(63) Continuation of application No. 16/476,245, filed as application No. PCT/CN2017/070455 on Jan. 6, 2017, now Pat. No. 10,911,928.

(51) Int. Cl.
*H04W 8/00* (2009.01)
*H04W 80/02* (2009.01)

(52) U.S. Cl.
CPC .............. *H04W 8/00* (2013.01); *H04W 80/02* (2013.01)

(58) Field of Classification Search
CPC .................................. H04W 80/02; H04W 8/00
See application file for complete search history.

(56) References Cited

U.S. PATENT DOCUMENTS

| | | |
|---|---|---|
| 2016/0006606 A1 | 1/2016 | Zhu et al. |
| 2017/0339609 A1 | 11/2017 | Youn et al. |
| 2019/0116531 A1 | 4/2019 | Ryu et al. |
| 2019/0364475 A1 | 11/2019 | Chandramouli |

FOREIGN PATENT DOCUMENTS

CN 106131914 A 11/2016

OTHER PUBLICATIONS

Nokia et al., "Interim agreement for MMF-SMF split and Update of Solution 4.16 (Signalling layer integrity between MM and SM entities)", SA WG2 Meeting #117 S2-165588. October 17-21, 2016, pp. 1-10.

Nokia et al., "Response to "Interim agreements for KI 7" proposal in S2-165801", SA WG2 Meeting #117 S2-165902, Oct. 17-21, 2016, pp. 1-11.

*Primary Examiner* — Kent Krueger
(74) *Attorney, Agent, or Firm* — Kunzler Bean & Adamson

(57) ABSTRACT

Apparatuses, methods, and systems are disclosed for network function data layer determination. One apparatus includes a receiver that receives a request message at a second network function. The request message includes identification data corresponding to a first network function. The apparatus also includes a processor that determines whether the first network function includes a data layer based on the request message.

20 Claims, 10 Drawing Sheets

NETWORK FUNCTION DATA LAYER DETERMINATION

CROSS-REFERENCE TO RELATED APPLICATIONS

This application is a continuation of U.S. patent application Ser. No. 16/476,245 filed on Jul. 5, 2019, which claims priority to PCT Application PCT/CN2017/070455 filed on Jan. 6, 2017, all of which are incorporated herein by reference in their entirety.

FIELD

The subject matter disclosed herein relates generally to wireless communications and more particularly relates to network function data layer determination.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Radio Access Network ("RAN"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), User Plane Function ("UPF"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, network functions ("NFs") may be used. NFs may interface with other NFs in addition to interfacing with subscriber data and context data. NFs may store context data corresponding to a UE in a data repository.

In certain configurations, subscriber data may be placed in a centralized location, while context data may be placed close to a NF to reduce latency for data access and to meet performance criteria. In various configurations, data may be stored in a distributed or centralized manner. The data may be replicated across multiple locations transparently for an application. Certain NFs may belong to different data layers. Obtaining data for a UE after the UE switches NFs may be complicated because NFs may belong to different data layers.

BRIEF SUMMARY

Apparatuses for network function data layer determination are disclosed. Methods and systems also perform the functions of the apparatus. In one embodiment, the apparatus includes a receiver that receives a request message at a second network function. In certain embodiments, the request message includes identification data corresponding to a first network function. The apparatus also includes a processor that determines whether the first network function includes a data layer based on the request message.

In one embodiment, the identification data includes data layer information that indicates a data layer corresponding to the first network function, network function information that indicates the first network function, and an internal identification allocated by the first network function to identify remote devices that access the first network function. In a further embodiment, the processor, in response to the first network function not comprising a data layer, retrieves context data from the first network function. In certain embodiments, the processor retrieves context data from the data layer by determining whether the second network function belongs to the data layer. In some embodiments, the processor, in response to the second network function belonging to the data layer, retrieves context data directly from the data layer. In various embodiments, the processor, in response to the second network function not belonging to the data layer, retrieves context data from the data layer via a data layer of the second network function.

A method for network function data layer determination, in one embodiment, includes receiving a request message at a second network function. In some embodiments, the request message includes identification data corresponding to a first network function. The method also includes determining whether the first network function includes a data layer based on the request message.

In one embodiment, an apparatus includes a transmitter that transmits a request message to a second network function. In certain embodiments, the second network function determines whether a first network function includes a data layer based on the request message. In various embodiments, the request message includes identification data corresponding to the first network function.

In one embodiment, the identification data includes data layer information that indicates a data layer corresponding to the first network function, network function information that indicates the first network function, and an internal identification allocated by the first network function to identify remote devices that access the first network function. In a further embodiment, in response to the first network function not including a data layer, the second network function retrieves context data from the first network function. In certain embodiments, the second network function retrieving context data from the data layer includes the second network function determining whether the second network function belongs to the data layer. In some embodiments, in response to the second network function belonging to the data layer, the second network function retrieves context data directly from the data layer. In various embodiments, in response to the second network function not belonging to the data layer, the second network function retrieves context data from the data layer via a data layer of the second network function.

A method for network function data layer determination, in one embodiment, includes transmitting a request message to a second network function. In various embodiments, the second network function determines whether a first network function includes a data layer based on the request message. In some embodiments, the request message includes identification data corresponding to the first network function.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
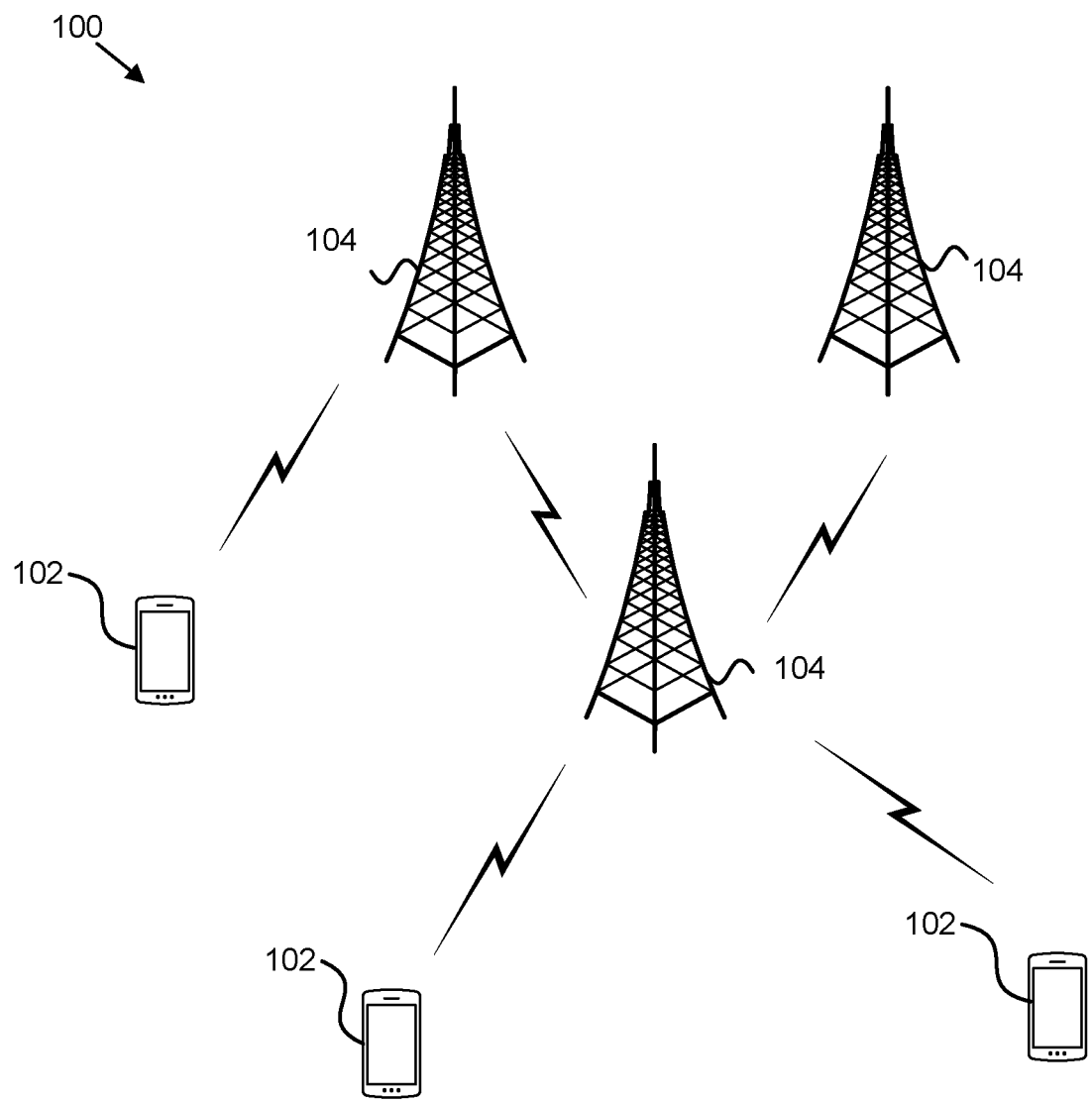
FIG. 1 is a schematic block diagram illustrating one embodiment of a wireless communication system for network function data layer determination.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for network function data layer determination. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. The base unit 104 may include a network function and may therefore perform the functions of a network function.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may receive a request message at a second network function. The request message may include identification data corresponding to a first network function. In some embodiments, the base unit 104 may determine whether the first network function includes a data layer based on the request message. Accordingly, a base unit 104 may be used for network function data layer determination.

In another embodiment, a remote unit 102 may transmit a request message to a second network function. The second network function may determine whether a first network function includes a data layer based on the request message. The request message may include identification data corresponding to the first network function. Accordingly, a remote unit 102 may be used for network function data layer determination.

Figure 2:
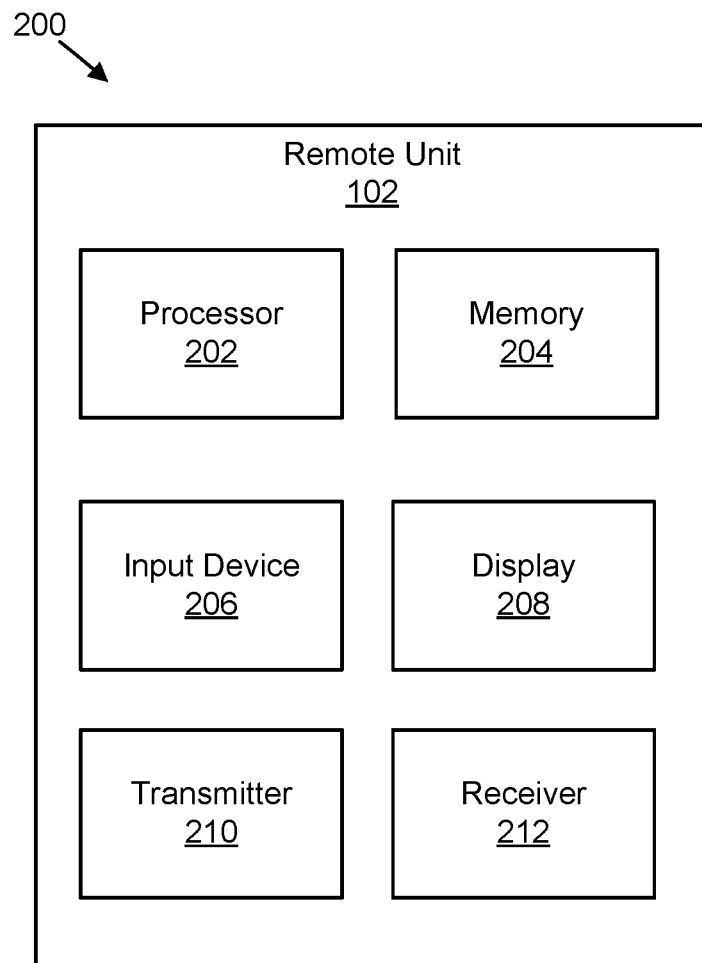
FIG. 2 is a schematic block diagram illustrating one embodiment of an apparatus that may be used for network function data layer determination.

FIG. 2 depicts one embodiment of an apparatus 200 that may be used for network function data layer determination. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to request messages. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 may be used to transmit a request message to a second network function. In some embodiments, the second network function may determine whether a first network function includes a data layer based on the request message. In various embodiments, the request message may include identification data corresponding to the first network function. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
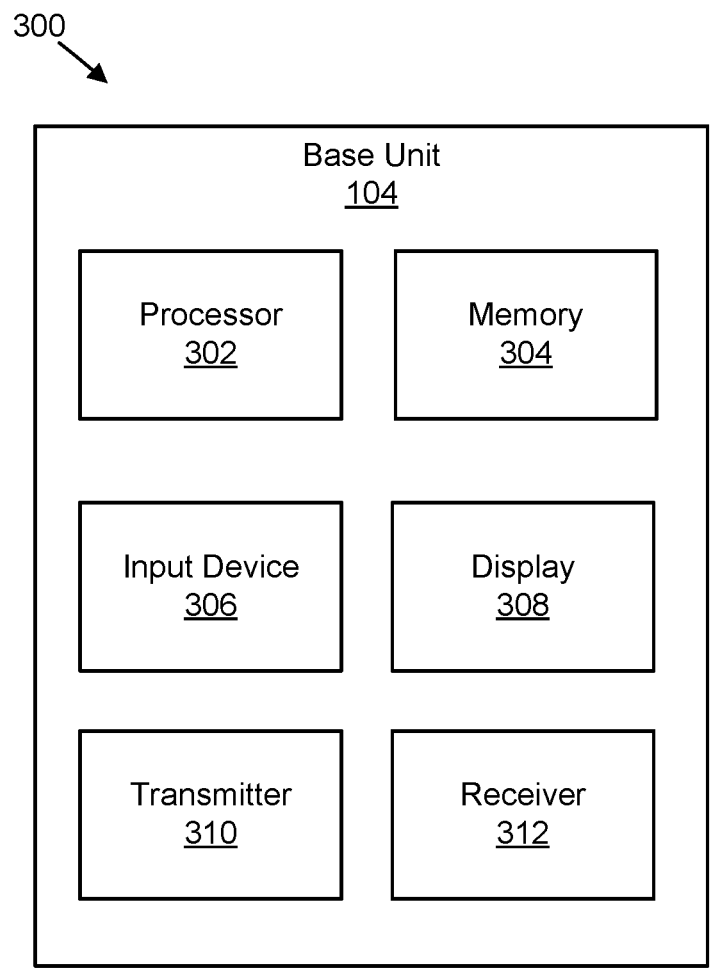
FIG. 3 is a schematic block diagram illustrating one embodiment of an apparatus that may be used for network function data layer determination.

FIG. 3 depicts one embodiment of an apparatus 300 that may be used for network function data layer determination. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiment, the receiver 312 is used to receive a request message at a second network function. In some embodiments, the request message may include identification data corresponding to a first network function. In certain embodiments, the processor 302 may determine whether the first network function includes a data layer based on the request message. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
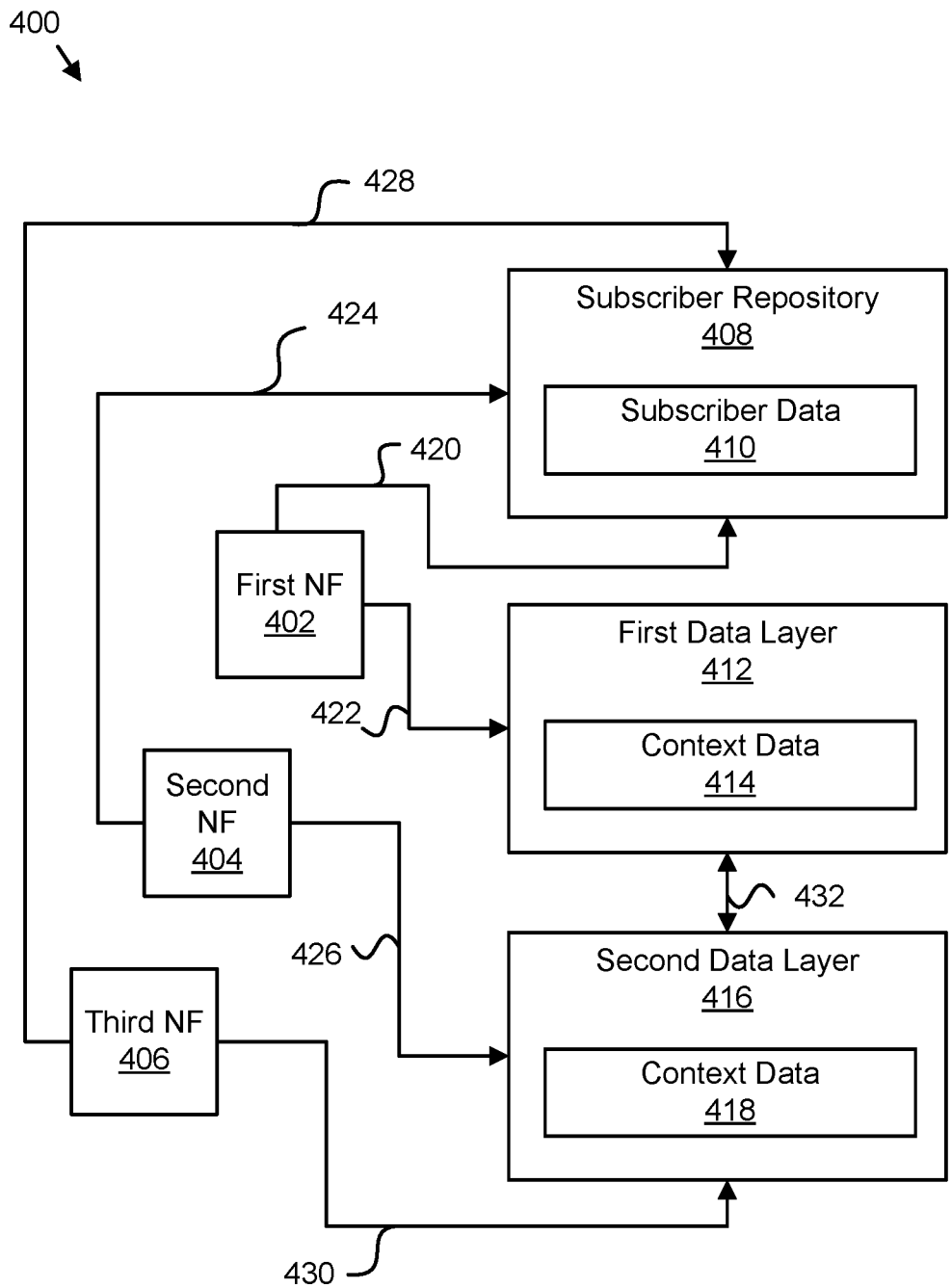
FIG. 4 is a schematic block diagram illustrating one embodiment of a system including multiple network functions.

FIG. 4 is a schematic block diagram illustrating one embodiment of a system 400 including multiple network functions. The system 400 includes a first network function ("NF") 402, a second NF 404, and a third NF 406. The system 400 also includes a subscriber repository 408 having subscriber data 410. In certain embodiments, the subscriber data 410 may include subscribed QoS information, subscribed mobility information, subscribed access restriction information, and so forth. The system 400 includes a first data layer 412 having context data 414 for users that access the first NF 402 and a second data layer 416 having context data 418 for users that access the second NF 404. In various embodiments, the context data 414 and/or the context data 418 may include mobility management ("MM") content, session management ("SM") content, and so forth.

In the illustrated embodiment, the first NF 402 belongs to the subscriber repository 408 and the first data layer 412 as shown by connections 420 and 422. Moreover, the second NF 404 belongs to the subscriber repository 408 and the second data layer 416 as shown by connections 424 and 426. Further, the third NF 406 belongs to the subscriber repository 408 and the second data layer 416 as shown by connections 428 and 430. A connection 432 may facilitate transmission of data between the first data layer 412 and the second data layer 416.

In some embodiments, if a UE accesses one NF, it will get the temporary identification ("temp-ID") from it. This temp-ID may include one or more of a Data-Layer-ID, a NF-type, a NF-ID, and an internal-ID allocated by an NF. In one embodiment, the format of the temp-ID is shown in Table 1.

TABLE 1

| Data Layer ID | NF Type | NF ID | Internal ID |
| --- | --- | --- | --- |

The Data-Layer-ID may be an identification of the data layer (e.g., the first data layer 412, the second data layer 416, etc.) which the NF belongs to. The NF-type may be a type of the NF, e.g., mobility management network function ("MMNF"), session management network function ("SMNF"), etc. The NF-ID may be the identification of an NF which the UE accesses. The Internal-ID may be allocated by an NF which the UE accesses. The number of bits of every ID may be on a particular implementation. If an NF doesn't belong to any data layer, the Data-Layer-ID field may be empty. So, the Data-Layer-ID field may be used to determine whether the NF belongs to a data layer, and which data layer the NF belongs to.

Figure 5:
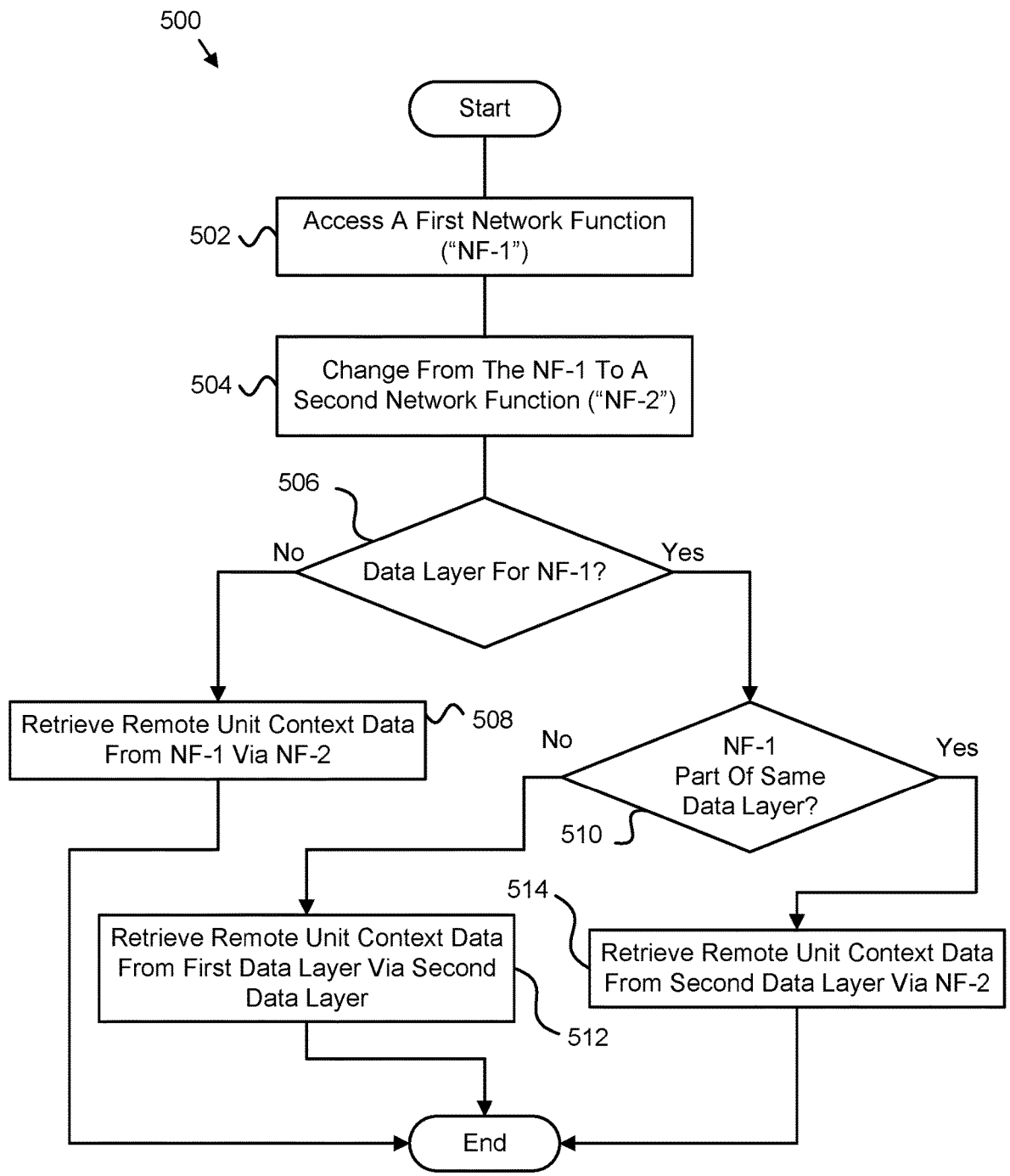
FIG. 5 is a schematic flow chart diagram illustrating one embodiment of a method for network function data layer determination.

FIG. 5 is a schematic flow chart diagram illustrating one embodiment of a method 500 for network function data layer determination. Specifically, the method 500 indicates what may occur in response to a remote unit 102 switching from one NF to another NF.

In certain embodiments, a remote unit 102 may access 502 a first NF (e.g., NF-1). In one embodiment, when the remote unit 102 accesses NF-1, NF-1 may allocate a temp-ID (e.g., temp-ID-1) to the remote unit 102. In various embodiments, the remote unit 102 may change 504 from NF-1 to a second NF (e.g., NF-2). When the remote unit 102 switches from NF-1 to NF-2, the remote unit 102 may send its temp-ID-1 to NF-2. The NF-2 may determine 506 whether the remote unit's source NF (e.g., NF-1) has a data layer based on the temp-ID-1. In response to NF-1 not having a data layer, the NF-2 may retrieve 508 (e.g., fetch) remote unit context data from NF-1.

In response to NF-1 having a data layer, NF-2 may determine 510 whether NF-1 is part of a same data layer as NF-2. NF-2 may determine 510 whether NF-1 is part of the same data layer through a Data-Layer-ID field in temp-ID-1. In response to NF-1 not being part of the same data layer as NF-2, the data layer of NF-2 (e.g., a second data layer) may retrieve 512 the remote unit context data from the data layer of NF-1 (e.g., a first data layer). Referring to FIG. 4, the retrieval may occur through the connection 432 between the first data layer 412 and the second data layer 416. In some embodiments, the data layer of NF-2 retrieving 512 the remote unit context data from the data layer of NF-1 may occur using a PULL/PUSH method. Returning to FIG. 5, in response to NF-1 being part of the same data layer (e.g., the second data layer) as NF-2, NF-2 may retrieve 514 the remote unit context data directly from the second data layer.

Figure 6:
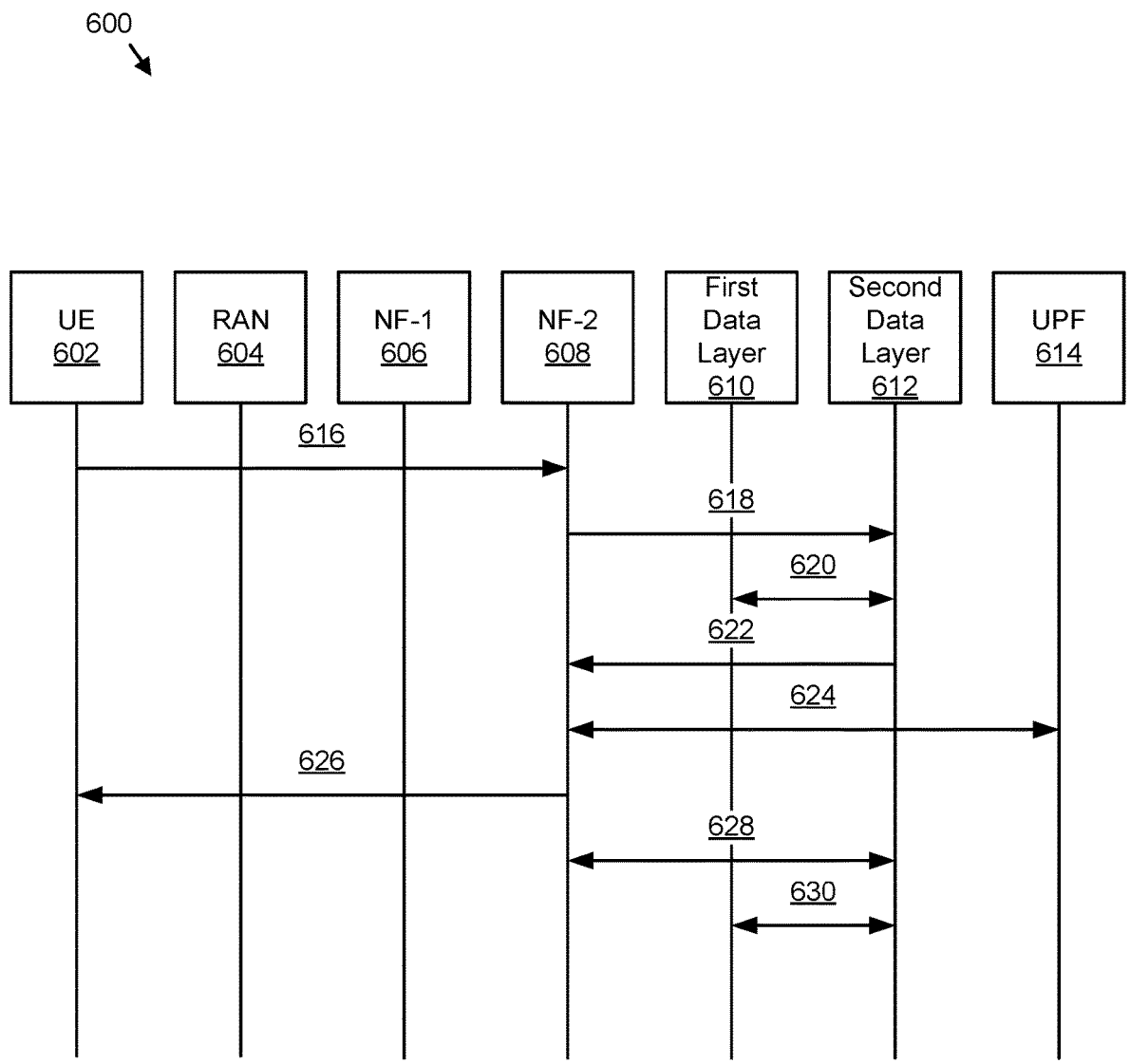
FIG. 6 is a schematic block diagram illustrating one embodiment of communications for network function data layer determination.

FIG. 6 is a schematic block diagram illustrating one embodiment of communications 600 for network function data layer determination. The communications 600 include communications between a UE 602, a RAN 604, an NF-1 606, an NF-2 608, a first data layer 610, a second data layer 612, and a UPF 614.

A first communication 616 is transmitted from the UE 602 to the NF-2 608 in response to the UE 602 performing an NF switch to switch from NF-1 606 to NF-2 608. The first communication 616 may include a request message to NF-2 608 which includes the UE's temp-ID-1 allocated by NF-1 606.

NF-2 608 determines which data layer NF-1 606 uses through the Data-Layer-ID field in the temp-ID-1. In one embodiment, if the Data-Layer-ID field is not empty, NF-2 608 sends a second communication 618 including a context request to the second data layer 612. If the Data-Layer-ID field is empty, operations may be performed as described in an embodiment described in relation to FIG. 7. The second data layer 612 may determine which data NF-1 606 uses. If NF-1 606 uses the first data layer 610, the second data layer 612 may send a third communication 620 to the first data layer 610. Specifically, the second data layer 612 may read the UE 602 context data from the first data layer 610 using a PULL/PUSH method, which may include the UE's temp-ID-1. Then the second data layer 612 sends a fourth communication 622 including a context response to NF-2 608.

If NF-1 606 uses the second data layer 612, the third communication 620 may not occur and the second data layer 612 sends the fourth communication 622 including a context response to NF-2 608.

A fifth communication 624 involves communication between the NF-2 608 and the UPF 614 during which the NF-2 608 and the UPF 614 modify the session. A sixth communication 626 may include the NF-2 608 sending a respond message to the UE 602. The respond message may include a temp-ID-2 allocated by NF-2 608 for the UE 602.

A seventh communication 628 may include NF-2 608 sending an update message to the second data layer 612. The update message may include the UE's new temp-ID-2. An eighth communication 630 may include the second data layer 612 sending the update message to the first data layer 610.

Figure 7:
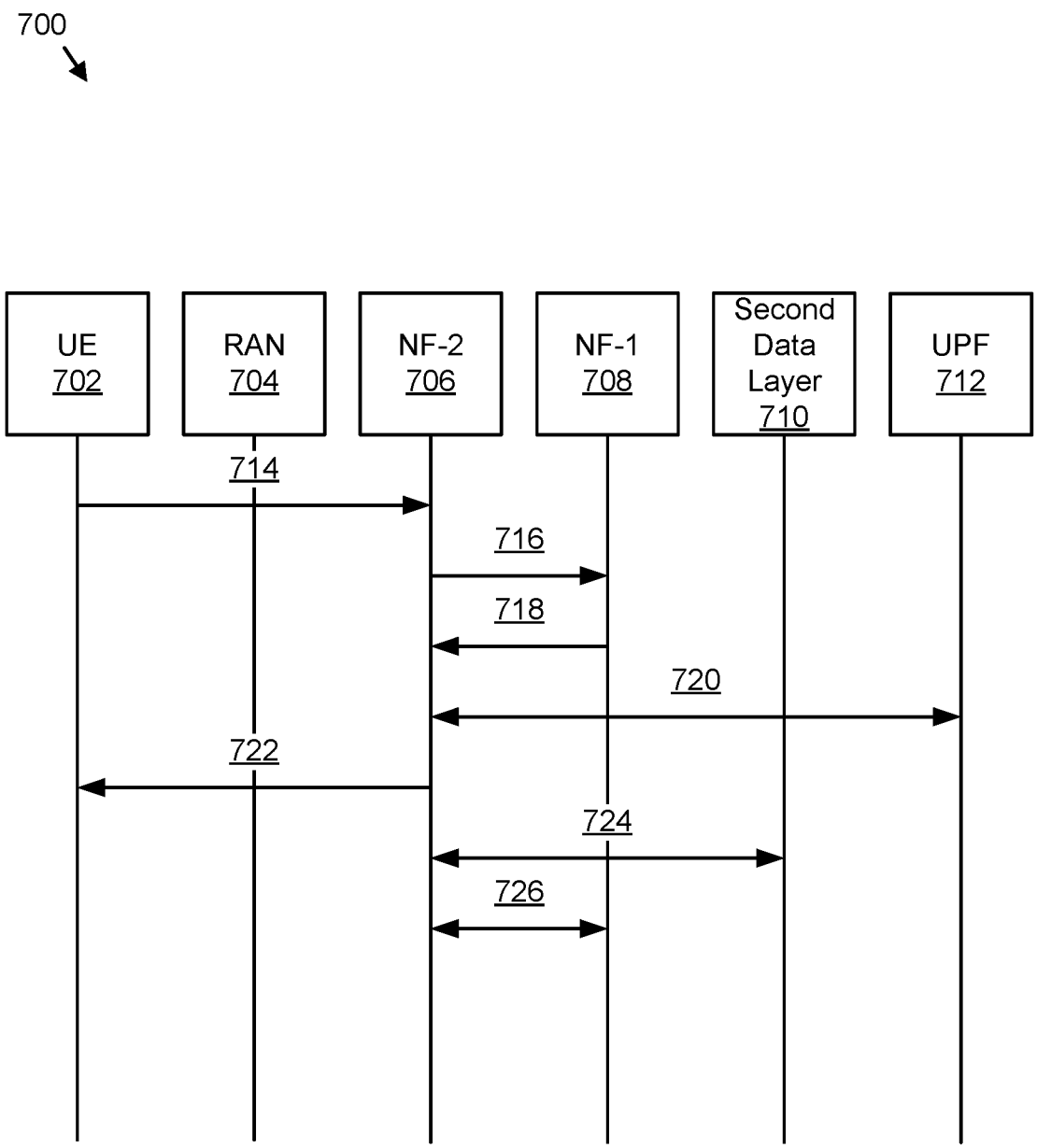
FIG. 7 is a schematic block diagram illustrating another embodiment of communications for network function data layer determination.

FIG. 7 is a schematic block diagram illustrating another embodiment of communications 700 for network function data layer determination. The communications 700 include communications between a UE 702, a RAN 704, an NF-2 706, an NF-1 708, a second data layer 710, and a UPF 712.

A first communication 714 is transmitted from the UE 702 to the NF-2 706 in response to the UE 702 performs an NF switch to switch from NF-1 708 to NF-2 706. The first communication 714 may include a request message to NF-2 706 which includes the UE's temp-ID-1 allocated by NF-1 708.

NF-2 706 determines which data layer the UE's source NF comes from through the Data-Layer-ID field in the temp-ID-1. If the Data-Layer-ID field is empty, NF-2 706 may send a second communication 716 to NF-1 708 to retrieve context data from the NF-1 708 directly. The second communication 716 may include a context request.

A third communication 718 transmitted from NF-1 708 may include a context response transmitted to NF-2 706.

A fourth communication 720 involves communication between the NF-2 706 and the UPF 712 during which the NF-2 706 and the UPF 712 modify the session. A fifth communication 722 may include the NF-2 706 sending a respond message to the UE 702. The respond message may include a temp-ID-2 allocated by NF-2 706 for the UE 702.

A sixth communication 724 may include NF-2 706 sending an update message to the second data layer 710. The update message may include the UE's new temp-ID-2. A seventh communication 726 may include NF-2 706 sending the update message to the NF-1 708.

Figure 8:
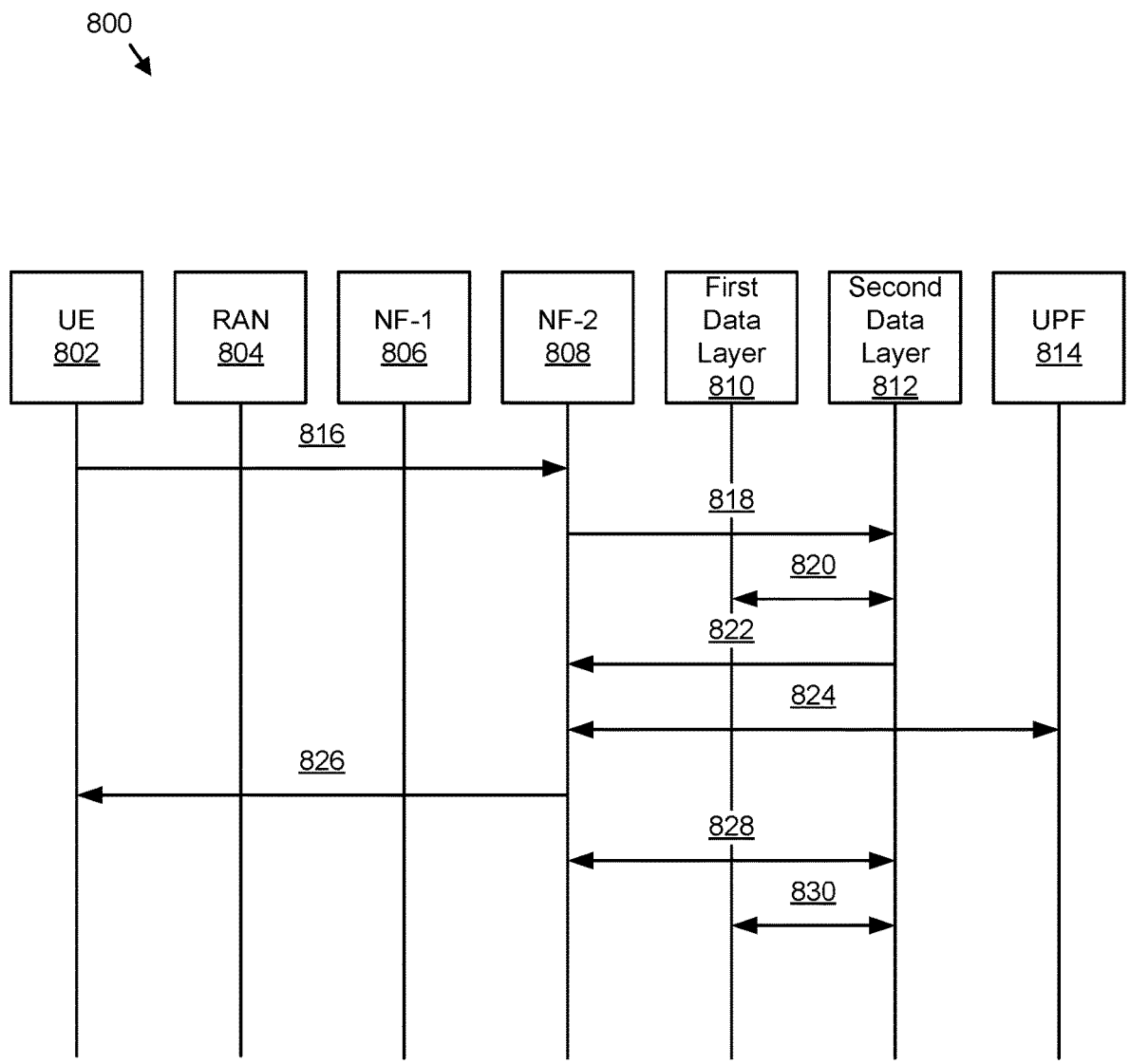
FIG. 8 is a schematic block diagram illustrating a further embodiment of communications for network function data layer determination.

FIG. 8 is a schematic block diagram illustrating a further embodiment of communications 800 for network function data layer determination. The communications 800 include communications between a UE 802, a RAN 804, an NF-1 806, an NF-2 808, a first data layer 810, a second data layer 812, and a UPF 814.

A first communication 816 is transmitted from the UE 802 to the NF-2 808 in response to the UE 802 performing a service request. The first communication 816 may include a service request message to NF-2 808 which includes a UE's temp-ID-1 allocated by NF-1 806 (NF-1 806 may be the NF that contains the information NF-2 808 uses to perform the procedure).

NF-2 808 determines which data layer NF-1 806 uses through the Data-Layer-ID field in the temp-ID-1. In one embodiment, if the Data-Layer-ID field is not empty, NF-2 808 sends a second communication 818 including a context request to the second data layer 812. The context request may include the temp-ID-1. If the Data-Layer-ID field is empty, operations may be performed as described in an embodiment described in relation to FIG. 7. The second data layer 812 may determine which data layer NF-1 806 uses. If NF-1 806 uses the first data layer 810, the second data layer 812 may send a third communication 820 to the first data layer 810. Specifically, the second data layer 812 may read the UE 802 context data from the first data layer 810 using a PULL/PUSH method, which may include the service type and UE's temp-ID-1. Then the second data layer 812 sends a fourth communication 822 including a context response to NF-2 808.

If NF-1 806 uses the second data layer 812, the third communication 820 may not occur and the second data layer 812 sends the fourth communication 822 including a context response to NF-2 808.

A fifth communication 824 involves communication between the NF-2 808 and the UPF 814 during which the NF-2 808 and the UPF 814 modify the session. A sixth communication 826 may include the NF-2 808 sending a respond message to the UE 802. The respond message may include a temp-ID-2 allocated by NF-2 808 for the UE 802.

A seventh communication 828 may include NF-2 808 sending an update message to the second data layer 812. The update message may include the UE's new temp-ID-2. An eighth communication 830 may include the second data layer 812 sending the update message to the first data layer 810.

Figure 9:
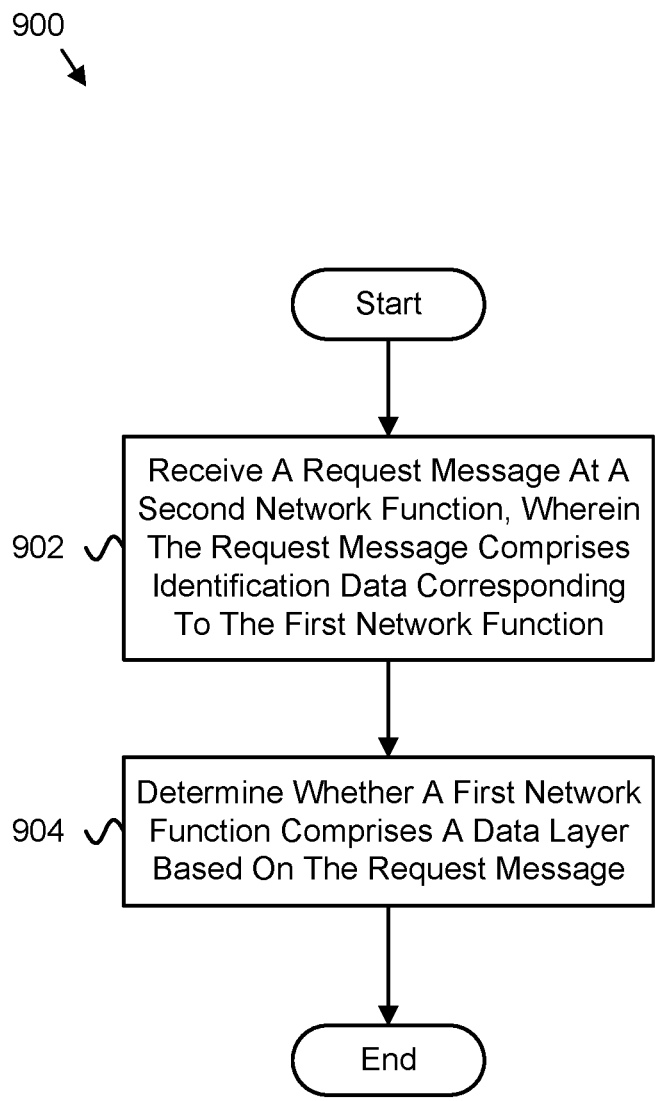
FIG. 9 is a schematic flow chart diagram illustrating another embodiment of a method for network function data layer determination.

FIG. 9 is a schematic flow chart diagram illustrating one embodiment of a method 900 for network function data layer determination. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a request message at a second network function. The request message may include identification data corresponding to a first network function. The method 900 also includes determining 904 whether the first network function includes a data layer based on the request message.

In one embodiment, the identification data includes data layer information that indicates a data layer corresponding to the first network function, network function information that indicates the first network function, and an internal identification allocated by the first network function to identify remote devices that access the first network function. In a further embodiment, the method 900, in response to the first network function not including a data layer, includes retrieving context data from the first network function. In certain embodiments, the method 900 includes retrieving context data from the data layer by determining whether the second network function belongs to the data layer. In some embodiments, the method 900, in response to the second network function belonging to the data layer, includes retrieving context data directly from the data layer. In various embodiments, the method 600, in response to the second network function not belonging to the data layer, includes retrieving context data from the data layer via a data layer of the second network function.

Figure 10:
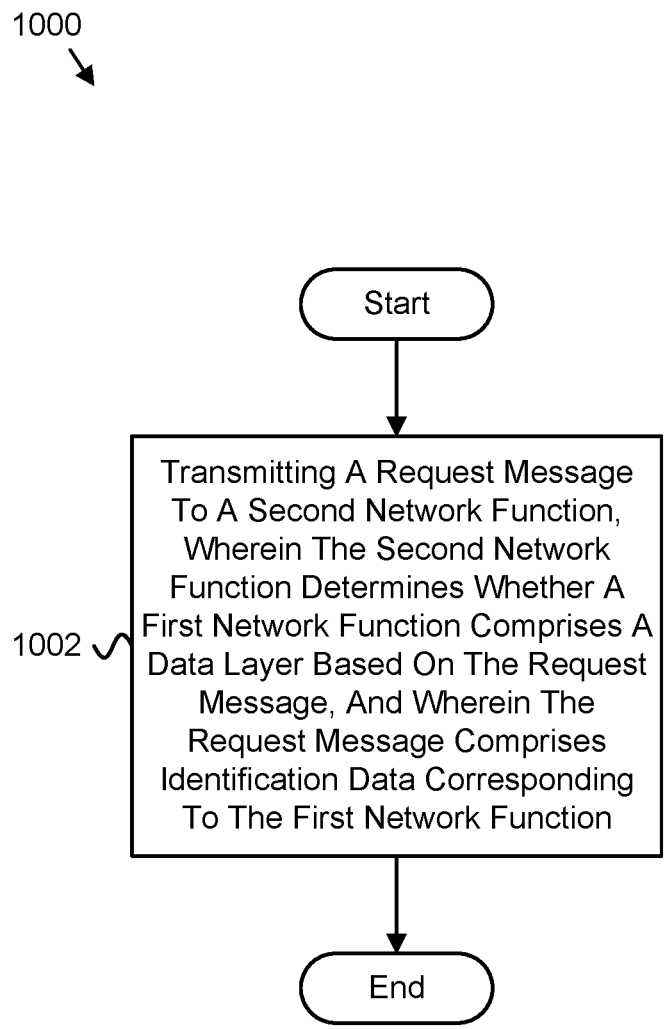
FIG. 10 is a schematic flow chart diagram illustrating a further embodiment of a method for network function data layer determination.

FIG. 10 is a schematic flow chart diagram illustrating one embodiment of a method 1000 for network function data layer determination. In some embodiments, the method 1000 is performed by an apparatus, such as the base unit 104. In certain embodiments, the method 1000 may be performed by a processor executing program code, for example, a microcontroller, a microprocessor, a CPU, a GPU, an auxiliary processing unit, a FPGA, or the like.

The method 1000 may include transmitting 1002 a request message to a second network function. In certain embodiments, the second network function determines whether a first network function includes a data layer based on the request message. In some embodiments, the request message includes identification data corresponding to the first network function.

In one embodiment, the identification data includes data layer information that indicates a data layer corresponding to the first network function, network function information that indicates the first network function, and an internal identification allocated by the first network function to identify remote devices that access the first network function. In a further embodiment, in response to the first network function not including a data layer, the second network function retrieves context data from the first network function. In certain embodiments, the second network function retrieving context data from the data layer includes the second network function determining whether the second network function belongs to the data layer. In some embodiments, in response to the second network function belonging to the data layer, the second network function retrieves context data directly from the data layer. In various embodiments, in response to the second network function not belonging to the data layer, the second network function retrieves context data from the data layer via a data layer of the second network function.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a receiver that receives a request message at a second network function, wherein the request message comprises identification data corresponding to a first network function; and
a processor that:
determines whether the first network function comprises a data layer based on the request message, wherein the request message comprises a data layer identifier field indicating the data layer; and
determines whether the second network function belongs to the data layer.

2. The apparatus of claim 1, wherein the identification data comprises data layer information that indicates a data layer corresponding to the first network function, network function information that indicates the first network function, and an internal identification allocated by the first network function to identify remote devices that access the first network function.

3. The apparatus of claim 1, wherein the processor, in response to the first network function not comprising the data layer, retrieves context data from the first network function.

4. The apparatus of claim 1, wherein the processor, in response to the second network function belonging to the data layer, retrieves context data directly from the data layer.

5. The apparatus of claim 1, wherein the processor, in response to the second network function not belonging to the data layer, retrieves context data from the data layer via a data layer of the second network function.

6. A method comprising:
receiving a request message at a second network function, wherein the request message comprises identification data corresponding to a first network function;
determining whether the first network function comprises a data layer based on the request message, wherein the request message comprises a data layer identifier field indicating the data layer; and
determining whether the second network function belongs to the data layer.

7. The method of claim 6, wherein the identification data comprises data layer information that indicates a data layer corresponding to the first network function, network function information that indicates the first network function, and an internal identification allocated by the first network function to identify remote devices that access the first network function.

8. The method of claim 6, further comprising, in response to the first network function not comprising the data layer, retrieving context data from the first network function.

9. The method of claim 6, further comprising, in response to the second network function belonging to the data layer, retrieving context data directly from the data layer.

10. The method of claim 6, further comprising, in response to the second network function not belonging to the data layer, retrieving context data from the data layer via a data layer of the second network function.

11. An apparatus comprising:
a transmitter that transmits a request message to a second network function, wherein the second network function determines whether a first network function comprises a data layer based on the request message and determines whether the second network function belongs to the data layer, and wherein the request message comprises identification data corresponding to the first network function, and the request message comprises a data layer identifier field indicating the data layer.

12. The apparatus of claim 11, wherein the identification data comprises data layer information that indicates a data layer corresponding to the first network function, network function information that indicates the first network function, and an internal identification allocated by the first network function to identify remote devices that access the first network function.

13. The apparatus of claim 11, wherein, in response to the first network function not comprising the data layer, the second network function retrieves context data from the first network function.

14. The apparatus of claim 11, wherein, in response to the second network function belonging to the data layer, the second network function retrieves context data directly from the data layer.

15. The apparatus of claim 11, wherein, in response to the second network function not belonging to the data layer, the second network function retrieves context data from the data layer via a data layer of the second network function.

16. A method comprising:
  transmitting a request message to a second network function, wherein the second network function determines whether a first network function comprises a data layer based on the request message and determines whether the second network function belongs to the data layer, and wherein the request message comprises identification data corresponding to the first network function, and the request message comprises a data layer identifier field indicating the data layer.

17. The method of claim 16, wherein the identification data comprises data layer information that indicates a data layer corresponding to the first network function, network function information that indicates the first network function, and an internal identification allocated by the first network function to identify remote devices that access the first network function.

18. The method of claim 16, wherein, in response to the first network function not comprising the data layer, the second network function retrieves context data from the first network function.

19. The method of claim 16, wherein, in response to the second network function belonging to the data layer, the second network function retrieves context data directly from the data layer.

20. The method of claim 16, wherein, in response to the second network function not belonging to the data layer, the second network function retrieves context data from the data layer via a data layer of the second network function.

* * * * *